Dec. 26, 1939.　　V. C. HEYBOURNE　　2,184,698
COPY HOLDER FOR CAMERAS
Filed Nov. 5, 1937　　2 Sheets-Sheet 1

Inventor
Victor C. Heybourne,
By
Attorney

Dec. 26, 1939. V. C. HEYBOURNE 2,184,698
COPY HOLDER FOR CAMERAS
Filed Nov. 5, 1937  2 Sheets-Sheet 2
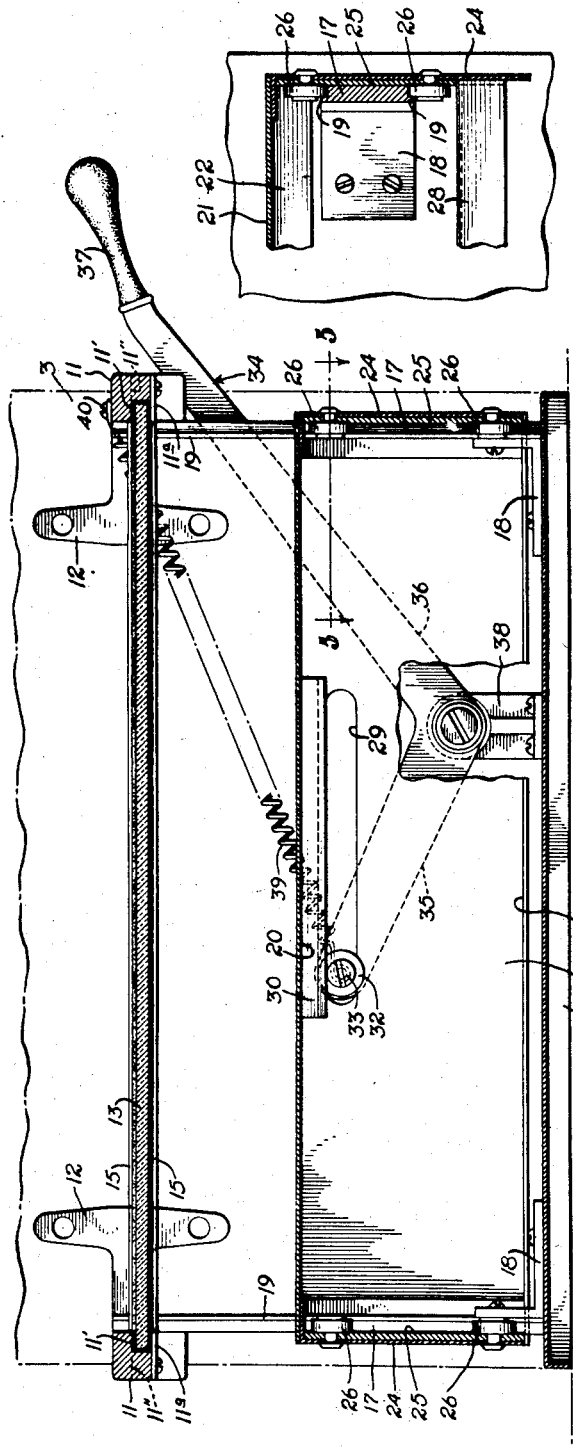
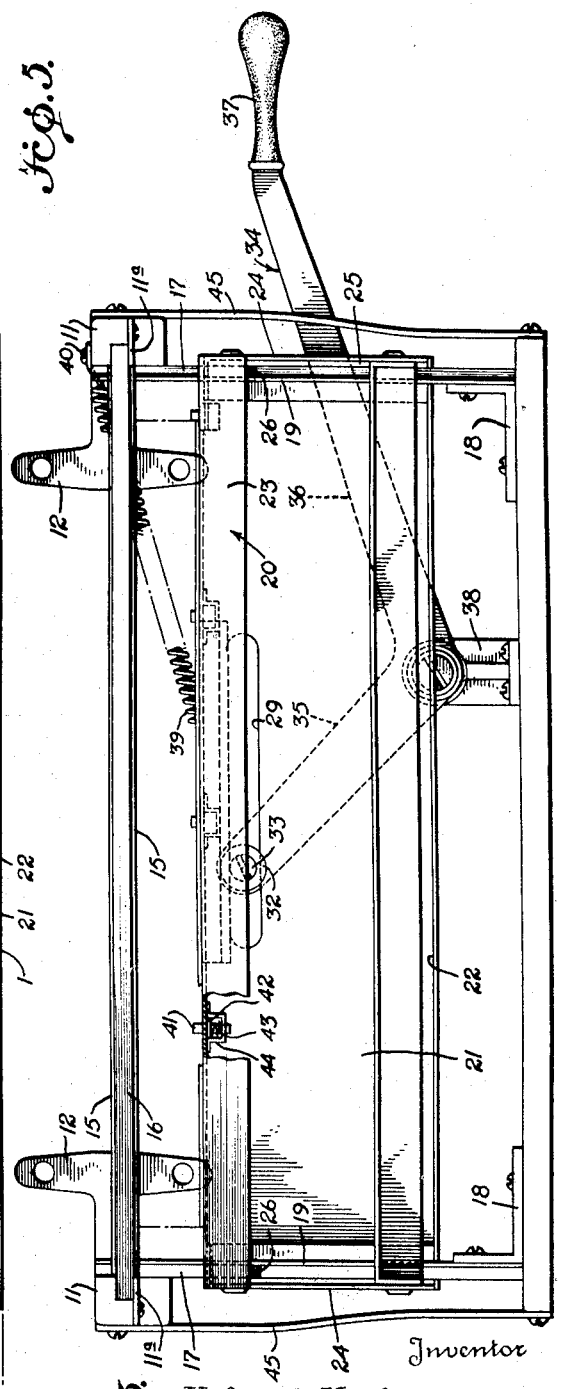
Inventor
Victor C. Heybourne,
By
Attorney Patented Dec. 26, 1939

2,184,698

UNITED STATES PATENT OFFICE 2,184,698

COPY HOLDER FOR CAMERAS

Victor C. Heybourne, Tonawanda, N. Y., assignor to Remington Rand Inc., Buffalo, N. Y.

Application November 5, 1937, Serial No. 172,885

5 Claims. (Cl. 88—24)

This invention relates to improvements in copyholders for document photographing cameras. The invention comprehends the provision of a copyholder for cameras particularly adapted to receive and support documents in sheet, book or similar form where the thickness of the bound documents varies, so as to support the face of the desired document in the photographic plane of the camera for making an accurate, clear photograph of the printing on the face of the document.

The invention further comprehends the provision of a copyholder for cameras having a glass plate located at the focal plane of the lens of the camera, against which the part of the document desired to be photographed may be placed within the focus of the lens for photographing; while a movable copy supporting plate is provided on the copyholder, manually operable toward and from the glass plate to receive a book, other bound documents or printed matter, for pressing a desired sheet against said plate in the focal plane of said camera lens; the copy supporting plate being readily operable by the camera operator through a lever so the camera and the copyholder is made highly convenient and simple in operation, in order that copies may be quickly made at low cost.

The invention comprehends the provision of a suitable frame for mounting on the camera in which a pair of arms carries a glass plate and has track members connected thereto for movably mounting a copy supporting plate for movement in parallel relation toward and from the glass plate, a suitable lever manually moving the copy supporting plate and having means counterbalancing the weight of the copy supporting plate to make easy the operation of the plate in the manual operation of the lever.

In the drawings:

Fig. 3 is an end elevation of the copyholder having portions broken away and shown in section for convenience in illustrating details.

Fig. 4 is a vertical cross section taken on line 4—4 of Fig. 2.

Fig. 5 is a fragmentary cross section taken on line 5—5 of Fig. 4.

Figures 1, 2:
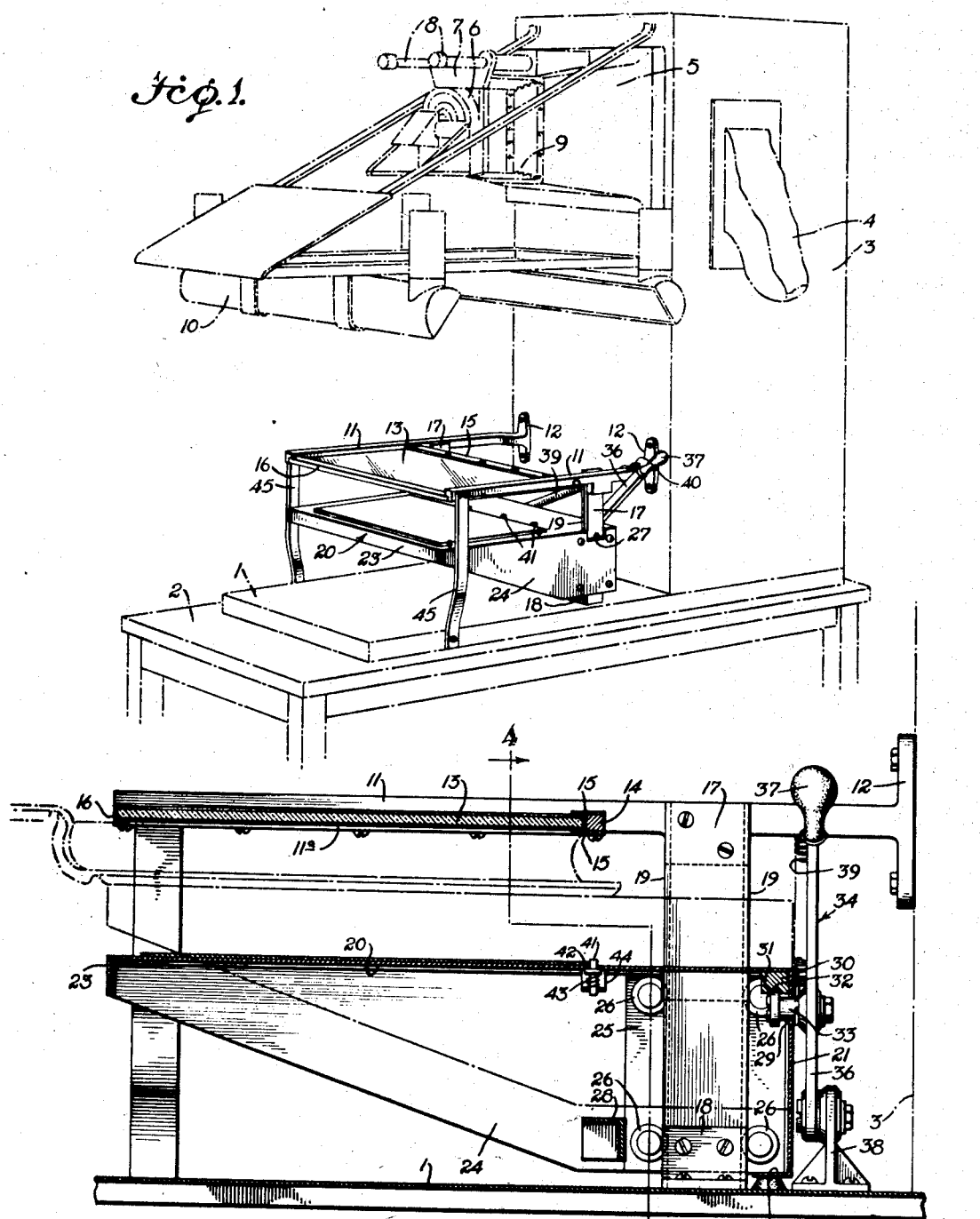
Fig. 1 shows a document photographing camera in dot and dash lines in perspective, with the copyholder of this invention shown in operative position in full lines, the copy supporting plate being shown at its lower limit of movement.
Fig. 2 is a vertical longitudinal cross section through the copyholder showing the parts on an enlarged scale.

The camera shown in Fig. 1 has a base 1 supported on table 2. A housing 3 on one end of the base supports a frame for receiving a sensitized sheet contained in housing 3, through manual manipulation by an operator inserting one arm through sleeve 4 and manipulating the sensitized sheet to place it in the photographing position and remove it therefrom in a well known manner. A tubular member 5 projects from housing 3 at the upper end thereof and carries a lens and shutter unit 6 on the outer end mounted on a plate 7 slidably mounted on rods 8 so the lens unit may be adjusted on rods 8 to vary the focus. A bellows between the lens unit and tubular member 5 indicated at 9 excludes the light from the sensitized card or sheet. Suitable means for supporting a source of light is indicated at 10 so as to illuminate a document or other object to be photographed.

The invention concerns the copyholder shown in full lines in Fig. 1. This copyholder has a frame structure including a pair of spaced parallel arms 11 extending in horizontal relation and each having an attaching foot 12 on one end secured to housing 3. The outer ends of arms 11 are each provided with a seating groove 11' on the inner edge. At the inner end groove 11' communicates with a transverse slot 11''. A glass plate 13 has the side edges mounted in grooves 11' of arms 11, the edges of plate 13 being protected by a felt strip. A cross bar 14 connects arms 11 at the inner edge of glass plate 13, the opposite ends seating in slots 11'' and being detachably secured therein. Suitable glass retaining strips 15 are secured to opposite faces of bar 14 to form a channel on the front side for receiving the rear margin of glass plate 13. The rear edge of plate 13 is also protected by a felt strip engaged about the edge when plate 13 is assembled in the channel formed by strips 15. Strips 15 have their ends terminate in abutment with the inner edges of arms 11. Retaining strips 11a are detachably mounted on the lower faces of arms 11 and have the inner edges extending over the side edges of glass plate 13 to retain said plate in the seats in arms 11. A protector strip 16 extends between the outer end of arms 11 to protect the outer edge of glass plate 13. While plate glass is used for this plate and may be substantially heavy it is found generally desirable to use metallic marginal strips to reinforce the edges of the glass plate, although for numerous applications of this copyholder invention, the outer strip 16 is not needed and may be omitted.

Between the rear edge of glass plate 13 and housing 3 arms 11 have the upper ends of track bars 17 detachably mounted thereon while the lower ends are connected to base 1 by means of angle brackets 18. The inner side edges of track bars 17 are formed with outwardly and oppositely directed guide flanges 19 as shown in Fig. 5.

A copy supporting plate 20 is formed with downwardly extending lateral flange 21 on the rear edge and a forwardly extending portion 22 parallel to plate 20 at the lower edge of flange 21. The front edge of copy supporting plate 20 is formed with depending flange 23. Side members 24 extend downwardly from opposite side edges and may be formed from the same sheet of material as plate 20, or as shown in the drawings, from separate pieces of sheet material spot welded or otherwise suitably secured thereto. Flange 21 forms the rear wall on the copy supporting plate. The rear edges of side walls 24 and the side edges of rear wall 21 are secured together as shown in Fig. 5 to thereby form a rigid copy supporting plate structure.

The rear portion of this copy supporting plate structure has a pair of guide plates 25 mounted therein one against each side wall on the inner face thereof as shown in Figs. 2, 4 and 5. These guide plates in the assembled relation of copy supporting plate 20 on track bars 17 are arranged to the outside of bars 17 as shown in Fig. 4. Two pairs of guide rollers 26 are rotatably mounted on each guide plate at opposite sides of track bars 17 so as to ride on the edges of said track bars adjacent to flanges 19 in the manner shown in Fig. 5. This provides for free rolling movement of the copy supporting plate in a vertical direction on track bars 17, the rollers being adapted for arrangement to accurately support and guide copy supporting plate 20 so it will move in parallel relation to the glass plate. Copy supporting plate 20 and side walls 24 are cut away to provide an opening for track bars 17 as shown in Fig. 1 and indicated by the numeral 27.

Side walls 24 are connected in front of guide plate 25 by an angle bar 28. Rear wall 21 is provided with a horizontal slot 29 and a bearing bar 30 is mounted at the upper edge of rear wall 21 and the rear edge of supporting plate 20, as shown in Fig. 2. Bearing bar 30 has slot 31 formed to receive the periphery of roller 32 carried by stud 33 mounted on the end of bell crank lever 34. Bell crank lever 34 has two angularly extending arms 35 and 36 respectively, stud 33 being mounted on the end of arm 35 while the free end of arm 36 is formed to provide handle 37 for the manipulation of the lever. The juncture between arms 35 and 36 is provided with a pivotal mounting on bracket 38 carried by base 1 of the camera. Tension spring 39 is connected to one of the arms 11 at 40, see Fig. 1, and the opposite end is connected to stud 33 on the free end of arm 35 of bell crank lever 34. This spring has sufficient tension to normally balance or slightly overcome the weight of the structure of the copy supporting plate so that in the manipulation handle 37 to operate bell crank lever 34 little manual force is required to move the lever up and down because of the counter-balancing operation of spring 39. This counter-balancing operation is such that the copy supporting plate 20 will remain in any position to which it is moved by the operation of lever 34.

Copy supporting plate 20 is provided with a series of positioning pins 41 which extend through apertures therein and have heads on the lower ends engaging the lower face of said plate as indicated at 42. These pins 41 are retained in position with the ends projecting above copy supporting plate 20 by means of compression springs 43 supported by brackets 44 attached to the underface of copy supporting plate 20 as clearly shown in Fig. 3. These pins are positioned on copy supporting plate 20 to engage the rear edges of sheets, books or other objects supported on plate 20 so as to hold them in the proper position to be within the focus of the camera for taking of photographic copies of documents.

The free ends of arms 11 have non-flexible straps 45 suitably secured thereto and connected with base 1 as clearly shown in Fig. 1 so as to rigidly support the glass plate carried by arms 11 in such a way that it will not be flexed out of focus through an operator leaning on the copy-holder.

Operation of handle 37 in an upward direction will secure movement of roller 32 along guide bar 30 to the left-hand position as shown in Fig. 4 while rollers 26 will ride on track bars 17 to guide supporting plate 20 in parallel relation to glass plate 13 downwardly away from plate 13. In this position of the parts a book or other group of bound documents may be inserted under glass plate 13 and supported by plate 20 with the desired printed face uncovered and exhibited upwardly. By moving handle 37 downwardly copy plate 20 is moved upwardly with the book or the like to bring the face of the desired page into engagement with the under face of glass plate 13 and by holding handle 37 downwardly under pressure the printed matter on the desired page of the book is brought into focus against the under face of glass plate 13 so that upon the operation of the camera shutter an accurate image will be reproduced on the negative. Where various documents to be photographed are bound together or contained in books they usually vary in thickness and it is obvious that copy supporting plate 20 may be moved closer to or farther from glass plate 13 in compressing the printed matter to hold the face of the desired page against the under surface of glass plate 13 during photographing, and thus compensate for the varying thickness. Single sheets may also be placed upon supporting plate 20 with their edges engaged against positioning pins 41 and the copy supporting plate then moves upwardly under glass plate 13 so as to hold a single sheet against the under face of glass plate 13 for producing an accurate photographic copy thereof.

The mounting of copy supporting plate 20 through means of guide plates 25 with rollers 26 and the structure of track bars 17 insures accurate parallel motion of copy supporting plate 20 to glass plate 13. Flanges 19 prevent sidewise motion of copy supporting plate 20 relative to track bars 17 and insures retention of plate 20 for motion toward and from glass plate 13 without sidewise motion in any direction with considerable ease of operation due to the roller mounting feature.

It will be noted that spring 39 is arranged so that in any position of arm 35 of lever 34 it is always at an acute angle to arm 35 and acts in a plane that is at an acute angle to plate 20. As a result of this relation of the parts of the lever, spring and copy supporting plate 20, roller 32 moves along horizontal guide bar 30 in a direction at right angles to the movement of copy plate 20 through the operation of spring 39 at the angle shown, a smooth operation of copy plate 20 up and down on track bars 17 is obtained.

The invention claimed is:

1. A copyholder for cameras, having a base and an upwardly extending housing on one end of said base, comprising a pair of arms secured at one end to said housing and extending laterally therefrom in spaced parallel relation over said base, a glass plate mounted on and extending between said arms, a pair of spaced parallel track members extending between and connected to said base and arms in perpendicular relation to said plate, each track connecting with one arm, a supporting plate mounted on said track members in parallel relation to said glass plate for movement toward and from said glass plate for receiving copy such as books of varying thickness to be supported on said supporting plate for movement toward and retention against said glass plate, and manually operable means for moving said supporting plate on said track members.

2. A copyholder for cameras having a supporting and housing structure, comprising a frame mounted on said structure, a glass plate mounted in said frame, spaced parallel track members forming part of said frame and projecting in perpendicular relation to the plane of said glass plate, a supporting plate having portions embracing said track members, bearing means between said embracing portions and said track members for movably supporting said supporting plate on said track members for parallel movement toward and from said glass plate, a lever pivoted on said housing structure and connected to said supporting plate manually operable to move said plate on said track members, and means normally urging said lever to move said supporting plate toward said glass plate.

3. A copyholder for cameras having a supporting and housing structure, comprising a frame mounted on said structure, a glass plate mounted in horizontal relation in said frame, spaced parallel vertical track members on said frame, a copy supporting plate having portions embracing said track members, bearing rollers mounted on the track member embracing portions of said plate having rolling engagement with said track members for mounting said copy supporting plate for movement on said track members in parallel relation toward and from said glass plate, a lever pivoted on said housing structure provided at a point spaced from the pivot for said lever with a travelling connection on a horizontal portion of said supporting plate, a handle on said lever for manually operating said lever to move said supporting plate toward and from said glass plate, and means for counter-balancing the weight of said supporting plate and lever.

4. A copyholder for cameras having a supporting and housing structure, comprising a frame mounted on said structure having a pair of spaced parallel horizontal arms, a glass plate mounted on and extending between said arms in horizontal relation, vertical track members connected with said arms, a horizontal copy supporting plate, side members mounted on said copy supporting plate, bearing rollers on said side members engaging said track members for rolling engagement in opposed relation for mounting said side members and copy supporting plate for movement toward and from said glass plate in parallel relation thereto, an end member on said copy supporting plate provided with a horizontal track, a bell crank lever pivoted intermediate its ends on said housing structure, one end being formed to provide a handle and the opposite end having a movable connection with said track for travelling movement thereon, and a tension spring connected with said frame member and the end of the lever engaged with said end member, said spring extending in acute angular relation from said lever arm connected with said end wall and operable to counter-balance said copy supporting plate, side walls and end wall, said handle being manually operable to move said copy supporting plate toward and from said glass plate.

5. A copyholder for cameras having a supporting and housing structure, comprising a frame mounted on said structure, said frame having a pair of spaced parallel horizontal arms, a glass plate mounted in horizontal relation and extending between the free ends of said arms, a pair of track bars each having one end secured to one of said arms and extending in perpendicular relation thereto and to the plane of said glass plate, in spaced relation at one side of said glass plate, a copy supporting plate having side and end flanges extending laterally thereto and formed to embrace said track bars, pairs of rollers on each side wall of said copy supporting plate arranged in opposed relation to engage opposite edges of said track bars for rolling engagement thereon to support said copy supporting plate for movement toward and from said glass plate in parallel relation, and a lever having arms extending in angular relation pivoted on said housing structure at the juncture of said arms, one of said arms having a roller on the free end thereof having rolling engagement in said horizontal slot in said end wall and the other arm of said lever forming a handle to provide for manual operation of said lever to move said copy supporting plate on said track bars toward and from said glass plate, and a spring connecting the end of the first mentioned arm of said lever with the arm of said frame member adjacent to the other arm of said lever forming the handle for normally counter-balancing said copy supporting plate.

VICTOR C. HEYBOURNE.